United States Patent
Bobzin (10) Patent No.: US 9,589,139 B2
(45) Date of Patent: *Mar. 7, 2017

(54) METHOD AND DEVICE FOR ALTERING A UNIFIED EXTENSIBLE FIRMWARE INTERFACE (UEFI) SECURE BOOT PROCESS IN A COMPUTING DEVICE

(71) Applicant: Insyde Software Corp., Taipei (TW)

(72) Inventor: Jeffery Jay Bobzin, Harvard, MA (US)

(73) Assignee: Insyde Software Corp., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,641

(22) Filed: Mar. 26, 2015

(65) Prior Publication Data

US 2015/0199521 A1 Jul. 16, 2015

Related U.S. Application Data

(63) Continuation of application No. 13/668,757, filed on Nov. 5, 2012, now Pat. No. 9,021,244.

(60) Provisional application No. 61/555,851, filed on Nov. 4, 2011.

(51) Int. Cl.
*G06F 15/177* (2006.01)
*G06F 21/57* (2013.01)
*G06F 9/44* (2006.01)

(52) U.S. Cl.
CPC .......... *G06F 21/575* (2013.01); *G06F 9/4401* (2013.01); *G06F 15/177* (2013.01); *G06F 2221/034* (2013.01); *G06F 2221/2105* (2013.01)

(58) Field of Classification Search
CPC ............................. G06F 21/575; G06F 15/177

USPC ......................... 713/1, 2, 176, 187
See application file for complete search history.

(56) References Cited

U.S. PATENT DOCUMENTS

| | | |
|---|---|---|
| 7,380,136 B2 | 5/2008 | Zimmer et al. |
| 7,984,286 B2 | 7/2011 | Zimmer et al. |
| 8,103,908 B2 * | 1/2012 | Rothman ............ G06F 11/0793 714/15 |
| 8,364,975 B2 | 1/2013 | Kumar et al. |
| 8,656,146 B2 | 2/2014 | Findeisen et al. |
| 8,694,761 B2 * | 4/2014 | Zimmer ................ G06F 21/575 713/1 |
| 9,021,244 B2 * | 4/2015 | Bobzin ................ G06F 21/575 713/1 |
| 2006/0161784 A1 | 7/2006 | Hunter et al. |
| 2007/0220276 A1 | 9/2007 | Croxford et al. |
| 2009/0249120 A1 | 10/2009 | Yao et al. |
| 2009/0319782 A1 | 12/2009 | Lee |
| 2009/0327741 A1 | 12/2009 | Zimmer et al. |

(Continued)

FOREIGN PATENT DOCUMENTS

TW 201137745 A 11/2011

OTHER PUBLICATIONS

International Preliminary Report on Patentability and Written Opinion for Application No. PCT/US2012/063535, 5 pages, dated May 6, 2014.

(Continued)

*Primary Examiner* — Chun Cao
(74) *Attorney, Agent, or Firm* — McCarter & English, LLP; John S. Curran (57) ABSTRACT

Firmware in a computing device is used to administer and alter a Secure Boot process for the computing device while continuing to provide protection from unauthorized third-party code.

20 Claims, 4 Drawing Sheets

(56) References Cited

U.S. PATENT DOCUMENTS

| | | |
|---|---|---|
| 2010/0083002 A1 | 4/2010 | Cui et al. |
| 2011/0078429 A1 | 3/2011 | Yang et al. |
| 2012/0084552 A1 | 4/2012 | Sakthikumar et al. |
| 2012/0260082 A1 | 10/2012 | Bobzin |
| 2013/0007427 A1 | 1/2013 | De Angelis et al. |

OTHER PUBLICATIONS

International Search Report and Written Opinion for Application No. PCT/US2012/063535, 7 pages, dated Jan. 14, 2013.

\* cited by examiner

METHOD AND DEVICE FOR ALTERING A UNIFIED EXTENSIBLE FIRMWARE INTERFACE (UEFI) SECURE BOOT PROCESS IN A COMPUTING DEVICE

RELATED APPLICATIONS

This application is a continuation of U.S. patent application Ser. No. 13/668,757, entitled "Secure Boot Administration in a Unified Extensible Firmware Interface (UEFI)-Compliant Computing Device", filed Nov. 5, 2012, now U.S. Pat. No. 9,021,244, which was related to, and claimed the benefit of, U.S. provisional patent application No. 61/555,851, entitled "Secure Boot Administration in a Unified Extensible Firmware Interface (UEFI)-Compliant Computing Device", filed on Nov. 4, 2011, the contents of both of which are incorporated herein by reference in their entirety.

BACKGROUND

Unified Extensible Firmware Interface (UEFI) is a specification created by a non-profit industry body detailing a programming interface between the Operating System (OS) and the included firmware of a computing device such as (but not limited to) a Personal Computer (PC). UEFI specifications describe a set of tools by which a computing device can move in an organized fashion from the power-applied state to fully operational. The computing device is initialized by firmware included within the device and this firmware provides a range of software services which facilitate the boot of the operating system. The UEFI specification tells the desired result but deliberately does not specify the internal tactic of implementation. The UEFI firmware specification replaces earlier OS/firmware interfaces previously used by the industry and commonly known as legacy BIOS.

The UEFI specification provides a facility called driver signature checking by which software from other parties can be 'signed' using public/private key cryptographic techniques at its origin. This signature is validated by the computing device firmware prior to allowing this software to operate. The signature checking concentrates on software added to configure optional components (plug-in boards) and software supplied by the operating system for early boot steps (i.e.: OS boot loaders). The signature checking is accomplished with a library of approved keys. The computing device must take care to not allow unauthorized software elements any ability to modify the library of approved keys as this would allow rogue software elements to defeat the signature checking.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM. Among other services, the firmware is responsible for operation of the computing device until a boot process can be run which loads an operating system for the computing device into memory. Once loaded, the operating system is in charge of normal operation of the computing device.

The Flash ROM is partitioned into several functional divisions or regions. One such region is the code store which must be protected from alteration by any entity except for entities that have been authorized to update the code store. A second region that is called the Authenticated Variable Region or Store holds Authenticated Variables defined in the UEFI specification and is used to hold UEFI-defined security information (the system security database). In addition to the UEFI-defined information the Authenticated Variable Store can be used to store user-defined data related to the ultimate uses of the computer. Because it contains security data and potentially sensitive user data the UEFI specification provides that the Authenticated Variable Region/Store must be protected from alteration by any entity except those authorized by the presence of identifying key data within the system security database. A third region, the UEFI variable store, contains lower security information which may be freely updated by user programs.

A computing device may also contain one or more elements known as Central Processing Units (CPU) which, when in operation, can read from and also erase and/or write the flash ROM. The CPU has a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by firmware. The exact triggers available differ somewhat from among system designs but the result when the platform appropriate trigger is used is that execution in main memory is immediately suspended and execution begins at a specific location in SMM memory. The computing device also contains a hardware circuit that can detect if the system is in SMM and is able to disable flash ROM erase and write operations when the system is not in SMM.

The UEFI specification provides for a secure boot process in which only validated executable code is executed during a boot sequence. The conventional UEFI secure boot process depends upon validation of executable code against a local system security database in an authenticated variable. During this process there is ordinarily only two ways in which the code can be validated and therefore approved for execution during the boot process. The first way to validate executable code is that the executable code is approved if the executable has been 'signed' by a certificate in the system security database. The same certificate may have been used to sign a large number of 'executables'. The second way to validate executable code is that an exact hash of the executable that had been previously stored in the system security database matches a hash of the executable being offered for execution (each hash uniquely identifies only the code upon which it was based and any alteration to that code after the storing of the hash will result in a mismatch when comparing a hash of the altered code to the hash of the original code). Once validated, the executable code may be executed during the boot sequence. Code which is not validated through either mechanism is not allowed to execute during a conventional UEFI Secure Boot.

Figure 1:
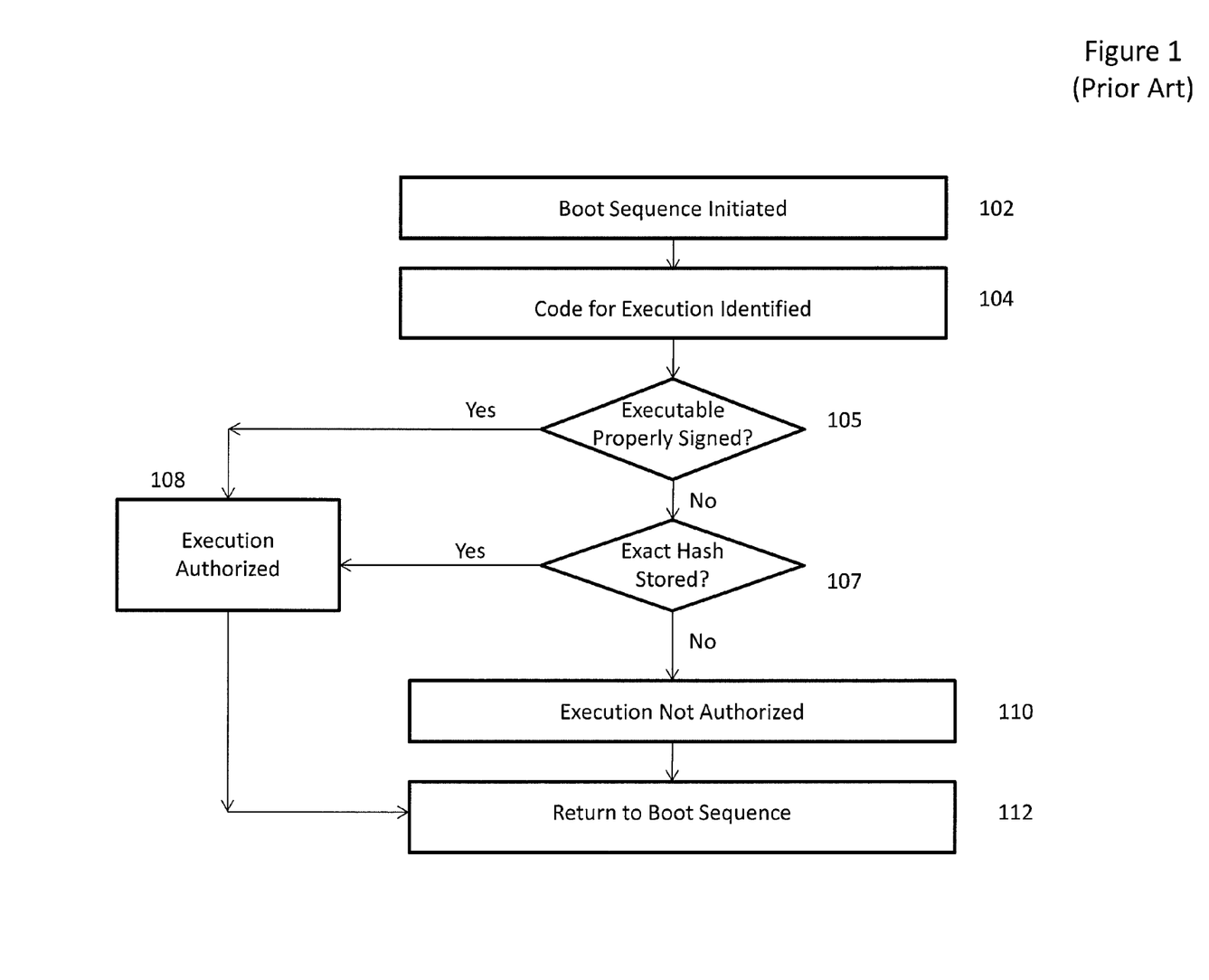
FIG. 1 (prior art) depicts an exemplary sequence of steps performed by a conventional UEFI-compliant computing device to validate executable code.

FIG. 1 (prior art) depicts an exemplary sequence of steps performed by a UEFI-compliant computing device to validate executable code prior to the code being executed during a conventional Secure Boot of the UEFI-compliant computing device. After firmware in the computing device initiates a boot sequence (step 102), the firmware identifies code to be executed, the "proposed executable code" (step 104). The boot sequence is stopped while the system security database is checked to see if it holds a certificate used to sign the proposed executable code (step 105). If a certificate used to sign the proposed executable code is present (step 105), the firmware authorizes the execution of the proposed executable code (step 108) and the boot sequence continues (step 112). On the other hand if a certificate used sign the proposed executable code is not present (step 105), the system security database is further checked to see if an exact hash of the proposed executable code is stored (step 107). If an exact hash of the proposed executable code is stored in the system security database (step 107), the firmware authorizes the execution of the proposed executable code (step 108) and the boot sequence continues (step 112). However, if an exact hash of the proposed executable code is not stored (step 107), the execution of the proposed executable code is not authorized and the boot sequence continues if possible without executing the proposed executable code (step 112).

BRIEF SUMMARY OF THE INVENTION

Embodiments of the present invention provide a mechanism for allowing firmware in a UEFI-compliant computing device to alter the normal Secure Boot process followed by the computing device so as to install a hash of a trusted unsigned application or OS bootloader in the local system security database (in an authenticated variable) while still protecting the computing device as much as possible from unauthorized third-party software. The embodiments of the present invention may utilize an enrollment module accessible only in SMM which may be invoked during a boot sequence by a 'present' user. The firmware modules used to execute this Secure Boot administration provide a secure process for temporarily suspending the normal validation of executable processes conducted during a boot sequence so that a hash of unsigned executable code may be enrolled in the system security database where it can be used in subsequent operations to validate the executable code upon which it is based. Furthermore, because the enrollment module is only able to be accessed and executed when the CPU is in SMM, the firmware enrollment module is hidden from examination and modification by an OS or other user programs and may perform the described techniques in a manner difficult to observe or modify by unauthorized third-party software.

In an embodiment, a method for administering a secure boot in a Unified Extensible Firmware Interface (UEFI)-compliant computing device includes the step of receiving an interrupt command from a user during a boot process for the UEFI-compliant computing device. The boot process is interrupted in response to the command. The method also displays to the user, following the interruption of the boot process, a listing of at least one task related to administering the boot process and receives a selection of one of the listed tasks. The method invokes System Management Mode (SMM) in response to the selection of the listed task and performs the selected task in SMM using a firmware module executable only within SMM. Following the performance of the task the computing device is reset and the boot process for the computing device is re-started.

In another embodiment, a Unified Extensible Firmware Interface (UEFI)-compliant computing device includes a processor supporting System Management Mode (SMM). The UEFI-compliant computing device also includes an input mechanism and a display surface in communication with the UEFI-compliant computing device. The UEFI-compliant computing device further includes at least one firmware module that when executed receives an interrupt command from a user via the input mechanism during a boot process for the UEFI-compliant computing device. The boot process is interrupted in response to the command. Following the interruption of the boot process, the firmware execution also displays to the user on the display surface a listing of at least one task related to administering the boot process and receives a selection of a listed task. The firmware execution invokes SMM in response to the selection of the listed task and performs the selected task in SMM. The firmware execution also resets the computing device after the performance of the selected task and re-starts the boot process for the computing device after the resetting.

In an embodiment, a method for administering a secure boot in a Unified Extensible Firmware Interface (UEFI)-compliant computing device includes the step of recognizing a previously recorded request to administer a boot process during a boot process for the UEFI-compliant computing device. The boot process is interrupted in response to the recognition. The method also displays to the user, following the interruption of the boot process, a listing of at least one task related to administering the boot process and receives a selection of one of the listed tasks. The method invokes System Management Mode (SMM) in response to the selection of the listed task and performs the selected task in SMM using a firmware module executable only within SMM. Following the performance of the task the computing device is reset and the boot process for the computing device is re-started.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

While ordinarily the conventional UEFI secure boot process described above provides a secure manner of validating executable code, in certain circumstances it can limit the amount of executable code available to the UEFI-compliant computing device. For example, the conventional UEFI Secure Boot process would prevent any unsigned application from being executed during the boot sequence due to the lack of a certificate used to sign the application or an exact hash of the application that is stored in the system security database. Since some applications are not signed prior to release or cannot be signed for legal and/or other reasons, or may be signed by an authority not included as a trusted signing entity when the system security database was originally installed during system manufacture, this conventional UEFI approach can limit the universe of available code for a computing device.

The embodiments of the present invention address these circumstances by enabling a deviation from the normal Secure Boot process followed by a UEFI-compliant device. Of note, the deviation from the normal Secure Boot process may be accomplished in a carefully circumscribed manner that limits the potential for unauthorized code to exploit the deviation by conducting malicious activities. For example, the embodiments of the present invention may only allow the deviation from the normal Secure Boot process to occur using a firmware module that only executes in SMM. Further, embodiments of the present invention may only allow deviation from a convention UEFI Secure Boot when the deviation is initiated by a 'present' user in physical contact with the UEFI-compliant computing device who interrupts a boot sequence by hitting the escape key or other defined interrupt key. In an alternative embodiment, an authorized user connected via a secured platform firmware management tool may be considered 'present' and may be allowed to initiate the deviation from the normal process. For example, in addition to direct user presence tests that base firmware decisions on user manipulation of directly connected input devices such as a keyboard for entry of passwords in order to grant permission to modify security settings, other embodiments may include connection to a user remote from the system and communicating using network hardware and industry standard secure network protocols which include sufficient protections so as to allow firmware to reasonably confirm that the command is from an authorized user and not an impersonator.

Figure 2:
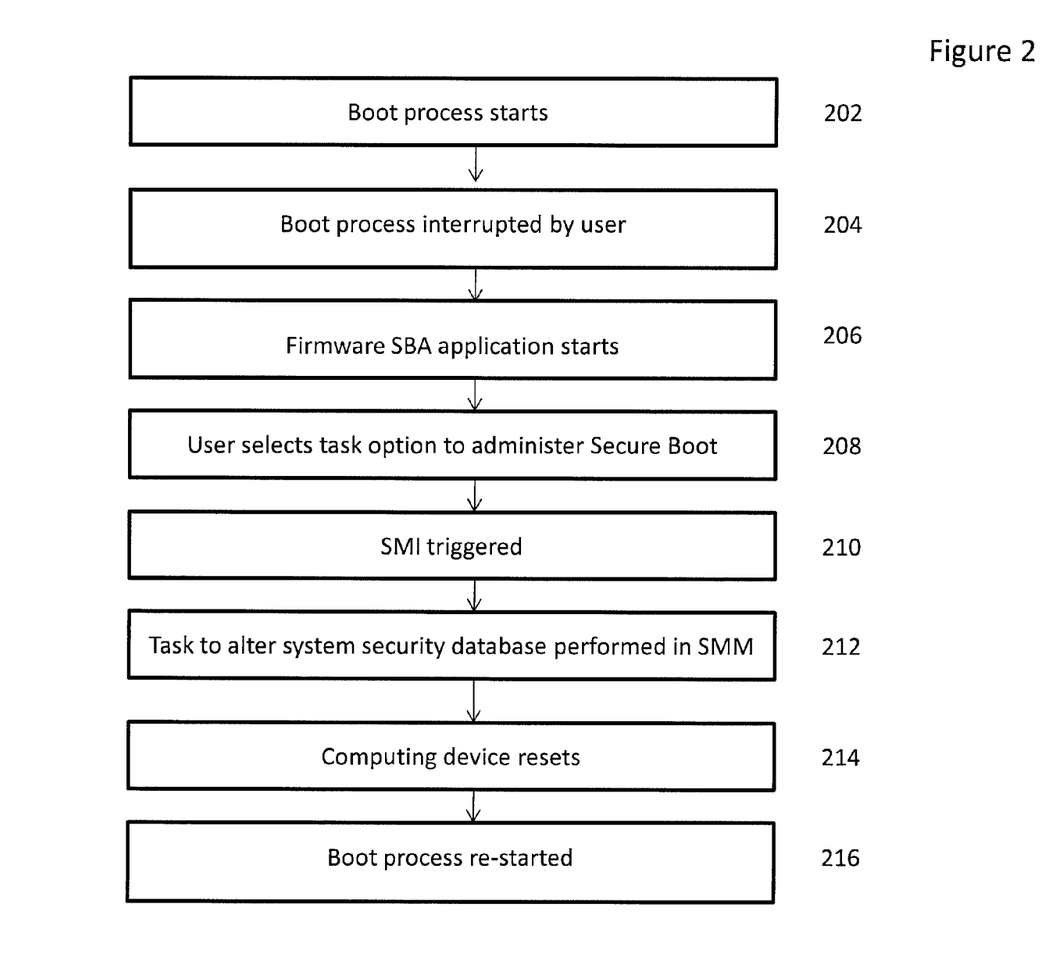
FIG. 2 depicts an exemplary sequence of steps performed by an embodiment of the present invention to utilize firmware modules to administer a Secure Boot process in a UEFI compliant device.

FIG. 2 depicts an exemplary sequence of steps performed by an embodiment of the present invention to utilize firmware modules to administer a Secure Boot process in a UEFI compliant device. The steps begin with a boot sequence being started by the firmware in the UEFI-compliant computing device (step 202). The boot sequence is then interrupted by a user generating an interrupt command (step 204). For example, the interrupt command may be generated by a physically 'present' user who triggers an interrupt such as by pressing an escape key. The requirement of the physical presence of a user by some embodiments of the present invention ensures that the process of accessing the system security database to administer and alter a Secure Boot cannot be conducted by unauthorized and malicious software alone. The receipt of the interrupt command causes a firmware Secure Boot Administration (SBA) application to start (step 206).

The SBA application may display a menu listing various tasks available to administer to the current Secure Boot process. Exemplary tasks are discussed further below. The user, whether physically present or not, selects one of the tasks for performance and the receipt of the selection causes the firmware to generate an SMI (step 210). Once in SMM, the selected task is performed by a firmware module that is executable only while the processor of the computing device is operating in SMM (step 212). By restricting the performance of the task which affects the system security database to a firmware module that only executes in SMM, the ability of malicious third party code to observe the task performance is sharply curtailed. The optional additional requirement of restricting the initiation of the administration of the Secure Boot process to an interruption of a boot sequence caused by a physically present user provides an additional level of security in this regard. Following the performance of the selected task, the computing device may then be reset (step 214) and the boot process re-initiated (step 216).

The SBA application may present the user with a choice of a number of different tasks. For example, the user may be presented with the options of:
1) Enrolling the hash of an application or driver,
2) Turning on or off the "enforce secure boot operation" which allows all code to run during the boot sequence, while allowing future enable with an identical database,
3) Clearing the system security database which deletes all certificates and disables secure boot indefinitely,
4) Resetting the system security database to factory settings, and
5) Restoring the system security database from a backup.

It should be appreciated that the above listing of tasks is exemplary and other Secure Boot Administration tasks may be performed in addition to or instead of those itemized above without departing from the scope of the present invention.

In addition to entry to a firmware menu by a user command during boot (such as the interrupt command described above), other methods of entry to the firmware SBA menu may be utilized. In another embodiment, the firmware SBA menu can also be entered in response to a menu request flag contained within a UEFI variable and set by process within the OS prior to restart. This addresses a problem where the boot speed of the computing device is so fast that the user entered command window is too small for the user to interrupt during the boot sequence and so the OS may provide a method to set a UEFI defined variable (such as OsIndications) that indicates to firmware that the SBA menu is needed during the next boot. Additionally, in some embodiments the firmware menu may be displayed to the user automatically in response to problems detected by firmware arising from failures that make the normal boot process unsuccessful.

Figure 3:
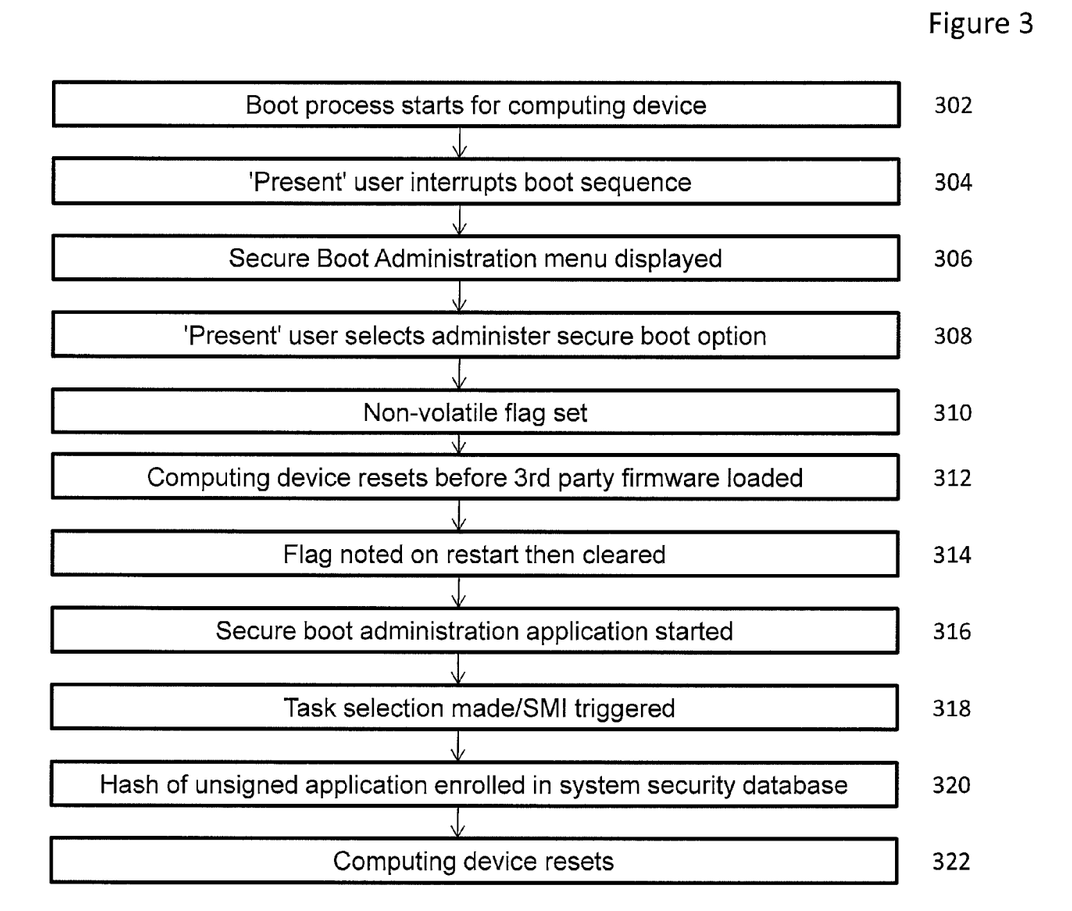
FIG. 3 depicts an exemplary sequence of steps performed by an embodiment of the present invention to utilize firmware modules in a UEFI compliant device to safely enroll a hash of an unsigned application in the system security database.

FIG. 3 depicts an exemplary sequence of steps performed by an embodiment of the present invention to enroll a hash of an unsigned application in the system security database. The sequence begins as a boot process starts for the computing device (step 302) and is interrupted by a 'present' user that interrupts the boot sequence (step 304). For example, the boot sequence may be interrupted by a user hitting an escape key on a keyboard. Alternatively, as noted above, instead of a user-initiated interrupt command, the firmware may recognize a request recorded in a UEFI-defined variable during the boot sequence. A firmware-generated Secure Boot Administration menu may then be displayed (step 306) from which a user selects an option to administer the Secure Boot of the computing device (step 308). Upon selection of the option, a non-volatile flag may be set (step 310) and the computing device then resets (step 312) before any 3rd party software is loaded (i.e.: before entering the boot manager phase where external software is selected). The implementation of the flag may vary from system to system as some chipsets have a set of non-volatile registers and so have additional resources. Upon restart the non-volatile flag is noted and then cleared (step 314) and a firmware SBA application is initiated (step 316). After a task selection from the user (step 318), an SMI is triggered and the selected task is performed in SMM (step 320). For example, the user may select the enrollment of a hash of an unsigned application or operating system bootloader and, following the SMI being triggered, the hash may be enrolled in the system security database. The computing device may then be reset (step 322). On the next and all subsequent boot sequences, the firmware that is seeking to validate the application during the boot sequence will find a hash of the application in the system security database and therefore the applications' code will be trusted and allowed to execute during the boot sequence as long as the hash of the unsigned application attempting to load matches the now enrolled hash in the system security database.

It should be appreciated that the above description is an illustrative sequence but the embodiments of the present invention are not limited thereto. In another embodiment, the computing device is not reset before beginning execution of the SBA application. Instead, the SBA application is initiated and triggers the SMI interrupt, the enrollment module enrolls the hash and access to SMM (and the enrollment module) is disabled before booting the OS for the computing device. In a different embodiment that is less secure, the task may be performed without any reset of the computing device.

Figure 4:
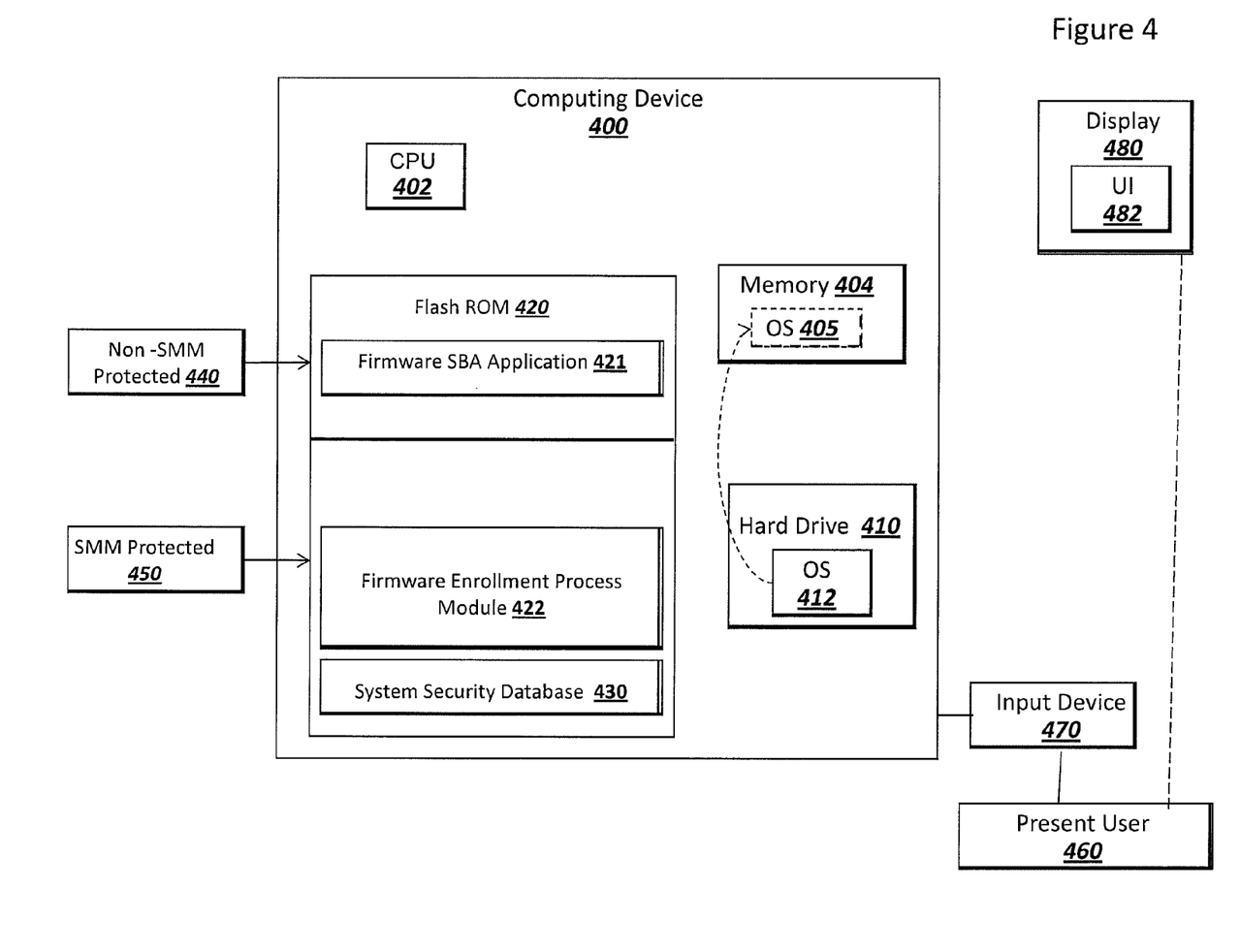
FIG. 4 depicts an exemplary environment suitable for practicing embodiments of the present invention

FIG. 4 depicts an exemplary environment suitable for practicing embodiments of the present invention. A UEFI-compliant computing device 400 includes a CPU 402 able to operate in normal mode and SMM. The computing device 400 may be a PC, laptop computer, tablet computing device, server, smartphone or some other type of computing device equipped with a processor and able to comply with the requirements of the UEFI specification. The computing device 400 may also include a memory 404 such as Random Access Memory (RAM). An operating system 412 stored on a hard drive 410 in, or in communication with, computing device 400 may be loaded into memory 404 as part of a boot process performed by the computing device.

The computing device 400 may also include flash (or other) ROM 420. In some cases the system design may incorporate multiple flash ROM devices. Flash ROM 420 may include firmware modules as described above that are operable at different points of the computing device's operation. For example, flash ROM 420 may include a firmware SBA application 421 that is operable when the CPU 402 is in a normal operation (non-SMM protected) mode 440. The flash ROM 420 may also hold a firmware enrollment module 422 that is only operable only when the CPU is in SMM protected mode 450. The flash ROM 420 may also hold a system security database 430 holding authorized keys used for signature checking and enrolled hashes of applications as set forth in the UEFI specification that are only accessible when the CPU is in SMM protected mode 450. A user 460 may access computing device 400 via an input device 470 such as a keyboard or other device. The user 460 may view a display which includes a generated user interface 482 displaying selectable options generated by the firmware SBA application 421. The selection of the options may lead to the enrollment of a hash of an unsigned application in the system security database 430 in a manner consistent with the description set forth above.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A method for altering a secure boot process in a computing device equipped with Unified Extensible Firmware Interface (UEFI)-compliant firmware, comprising:
   identifying an interrupt command during a UEFI secure boot process for the computing device, the secure boot process interrupted in response to the command;
   displaying to a user, following the interruption of the secure boot process, a listing of at least one task related to altering the secure boot process;
   receiving a selection of a listed task;
   invoking System Management Mode (SMM) in response to the selection of the listed task;
   performing the selected task in SMM using a firmware module executable only within SMM;
   exiting SMM after the performing of the task, and
   booting the computing device after the exiting.

2. The method of claim 1 wherein the performing of the selected task further comprises:
   enrolling a hash of unsigned executable code in a system security database.

3. The method of claim 1 wherein the performing of the selected task further comprises:
   turning off a requirement to enforce the secure boot so as to allow all code to run during a boot sequence.

4. The method of claim 1 wherein the performing of the selected task further comprises:
   clearing a system security database of all certificates and disabling the secure boot.

5. The method of claim 1 wherein the performing of the selected task further comprises:
   restoring a system security database from a backup location or resetting the system security database to a factory setting.

6. The method of claim 1 wherein the interrupt command may only be received from a physically present user who is physically accessing the computing device.

7. The method of claim 1 wherein the interrupt command may be received from a user who is accessing the computing device from a remote location.

8. The method of claim 1 wherein the secure boot process is interrupted when a previously recorded request to alter the secure boot process is identified during the boot sequence.

9. The method of claim 8 wherein the request is recorded in a UEFI-defined variable by an operating system process.

10. A non-transitory computer-readable medium holding computer-executable instructions for altering a secure boot process in a computing device equipped with Unified Extensible Firmware Interface (UEFI)-compliant firmware, the instructions when executed causing the computing device to:

identify an interrupt command during a UEFI secure boot process for the computing device, the secure boot process interrupted in response to the command;

display to a user, following the interruption of the boot process, a listing of at least one task related to altering the secure boot process;

receive a selection of a listed task;

invoke System Management Mode (SMM) in response to the selection of the listed task;

perform the selected task in SMM using a firmware module executable only within SMM;

exit SMM after the performing of the task, and boot the computing device after the exiting.

11. The medium of claim 10 wherein the performing of the selected task enrolls a hash of unsigned executable code in a system security database.

12. The medium of claim 10 wherein the performing of the selected task turns off a requirement to enforce the secure boot so as to allow all code to run during a boot sequence.

13. The medium of claim 10 wherein the performing of the selected task clears a system security database of all certificates and disabling the secure boot.

14. The medium of claim 10 wherein the performing of the selected task restores a system security database from a backup location or resetting the system security database to a factory setting.

15. The medium of claim 10 wherein the interrupt command may only be received from a physically present user who is physically accessing the computing device.

16. The medium of claim 10 wherein the interrupt command may be received from a user who is accessing the computing device from a remote location.

17. The medium of claim 10 wherein the secure boot process is interrupted when a previously recorded request to alter the secure boot process is identified during the boot sequence.

18. The medium of claim 17 wherein the request is recorded in a UEFI-defined variable by an operating system process.

19. A computing device equipped with Unified Extensible Firmware Interface (UEFI)-compliant firmware for altering a UEFI secure boot process, comprising:

a processor, the processor supporting System Management Mode (SMM);

a display surface in communication with the computing device;

an input mechanism; and at least one firmware module, the firmware module when executed:

identifying an interrupt command during a UEFI secure boot process for the computing device, the secure boot process interrupted in response to the command;

displaying to a user, following the interruption of the boot process, a listing of at least one task related to altering the secure boot process;

receiving a selection of a listed task;

invoking System Management Mode (SMM) in response to the selection of the listed task;

performing the selected task in SMM using a firmware module executable only within SMM; and booting the computing device after exiting SMM.

20. The computing device of claim 19 in which the task performed is to enroll a hash of executable code to be launched in the boot process into a system security database.

* * * * *